US008275733B2

(12) United States Patent
McCullough et al.

(10) Patent No.: US 8,275,733 B2
(45) Date of Patent: Sep. 25, 2012

(54) CREATING AN ALBUM

(75) Inventors: James L McCullough, San Diego, CA (US); Jennifer Marie McCord Brister, San Marcos, CA (US); Eamonn O'Brien-Strain, San Francisco, CA (US); Fred Zuill, Poway, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 849 days.

(21) Appl. No.: 12/402,242

(22) Filed: Mar. 11, 2009

(65) Prior Publication Data

US 2010/0235312 A1 Sep. 16, 2010

(51) Int. Cl.
*G06F 17/00* (2006.01)
*G06N 5/02* (2006.01)

(52) U.S. Cl. .......................................................... 706/47
(58) Field of Classification Search ...................... 706/47
See application file for complete search history.

(56) References Cited

U.S. PATENT DOCUMENTS

| 6,629,104 B1 | 9/2003 | Parulski et al. |
| 6,636,648 B2 | 10/2003 | Loui et al. |
| 6,771,801 B1 | 8/2004 | Fisher et al. |
| 2003/0120673 A1 | 6/2003 | Ashby et al. |
| 2005/0111737 A1 | 5/2005 | Das et al. |
| 2005/0192924 A1 | 9/2005 | Drucker et al. |
| 2006/0078201 A1 | 4/2006 | Kim et al. |
| 2006/0253783 A1 | 11/2006 | Vronay et al. |
| 2007/0064121 A1 | 3/2007 | Issa et al. |
| 2007/0065044 A1 | 3/2007 | Park et al. |
| 2007/0133940 A1 | 6/2007 | Freeman |
| 2007/0196033 A1 | 8/2007 | Russo |
| 2008/0094420 A1 | 4/2008 | Geigel et al. |
| 2008/0215964 A1 | 9/2008 | Abrams et al. |
| 2008/0235275 A1 | 9/2008 | Tanaka et al. |
| 2008/0306995 A1 | 12/2008 | Newell et al. |

FOREIGN PATENT DOCUMENTS

| WO | WO-2006098418 | 9/2006 |
| WO | WO-2007102265 | 9/2007 |

OTHER PUBLICATIONS

Wood, Mark "Exploiting Semantics for Personalized Story Creation" IEEE International Conference on Semantic Computing Aug. 2008. [Online] Downloaded Feb. 9, 2012 http://ieeexplore.ieee.org/stamp/stamp.jsp?tp=&arnumber=4597218&tag=1.*
Ahn, Luis and Laura Dabbish. "Labeling Images with a Computer Game" ACM Apr. 2004. [Online] Downloaded Feb. 9, 2012 http://delivery.acm.org/10.1145/990000/985733/p319-vonahn.pdf?ip=151.207.246.4&acc=ACTIVE%20SERVICE&CFID=65060753&CFTOKEN=11074824&_acm_=1328808976_c59e9208d3e2dc72f4e3c05d9319961.*
Balabanovic, Marko Lonnly L Chu and Gregory Wolff. "Storytelling with Digital Photographs" CHI Letters Apr. 2000. [Online] Downloaded Feb. 9, 2012. http://delivery.acm.org/10.1145/340000/332505/p564-balabanovic.pdf?ip=151.207.246.4&acc=ACTIVE%20SERVICE&CFID=65060753&CFTOKEN=11074824&_acm_=1328636365_c8837da15b7aa38ce3a52a620ae8b23f.*

* cited by examiner

*Primary Examiner* — Ben Rifkin
(74) *Attorney, Agent, or Firm* — Gary A. Perry (57) ABSTRACT

A system for creating an album is disclosed. In one embodiment, the system includes an image input configured to receive related images, an image memory coupled to image input, an image processor coupled to image memory, and an album output coupled to image processor. The image processor is configured to use game play with users to assign metadata labels to the related images and assign album layout rules based upon the story schema and metadata labels.

19 Claims, 8 Drawing Sheets

CREATING AN ALBUM

BACKGROUND OF THE INVENTION

Users of digital cameras may choose to store their captured digital images in a hard drive or other database and share individual files with family and friends. Other digital camera users may choose to print copies of digital images for storing and sharing. Some users may find these solutions to be inadequate, as they desire a solution for storing and displaying digital images that combine archivability, storytelling capabilities, and ease of use.

Applications exist that allow for the creation of an album with minimal user involvement, but these applications may fail to take into account the meaning and context of the images as they relate to the user of the application. Such lack of context may lead to poor clustering of images as they are segregated into chapters, and visual promotion of images of poor quality. Existing album creation applications that do consider the meaning and context of images as they relate to the user may be difficult to use. Such applications may require that the user spend a great deal of time naming and organizing the images and make a multitude of choices regarding the laying out of the album. Many users will find such tasks to be tedious and creatively taxing. Other users may appreciate the creative opportunities, yet not have the time to allocate to a time-consuming endeavor. Consequently, users of existing album-creation applications may be inclined to give up their goal of creating an album on their own.

BRIEF DESCRIPTION OF THE DRAWINGS

The accompanying drawings illustrate various embodiments of the principles described herein and are a part of the specification. The illustrated embodiments are merely examples and do not limit the scope of the claims. Throughout the drawings, identical reference numbers designate similar, but not necessarily identical elements.

DETAILED DESCRIPTION OF EMBODIMENTS

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an embodiment", "an example" or similar language means that a particular feature is included in at least that one embodiment, but not necessarily in other embodiments. The various instances of the phrase "in one embodiment" or similar phrases in various places in the specification are not necessarily all referring to the same embodiment. The terms "comprises/comprising", "has/having", and "includes/including" are synonymous, unless the context dictates otherwise.

The accompanying drawings illustrate various embodiments of the principles described herein and are a part of the specification. The illustrated embodiments are merely examples and do not limit the scope of the claims. Throughout the drawings, identical reference numbers designate similar, but not necessarily identical elements.

Embodiments of the invention provide a system for creating an album, including an image input configured to receive related images, an image memory coupled to the image input, an image processor coupled to the image memory, and an album output coupled to the image processor. The image processor is configured to retrieve the related images from image memory, assign a story schema to the related images based upon user input, use game play with users to assign metadata labels to the related images, assign album layout rules based upon the story schema and the metadata labels, create album pages based upon album layout rules, assign related images to album pages by comparing the metadata labels to album layout rules, and send the album to the album output.

Embodiments of the invention further provide a method for creating an album, including incorporating related images into an image memory, assigning a story schema to the related images based upon user input, using game play with users to assign metadata labels to related images, assigning album layout rules based upon the story schema and metadata labels, creating album pages based upon the album layout rules, assigning related images to the album pages by comparing the metadata labels to the album layout rules, and displaying the album.

Figure 1:
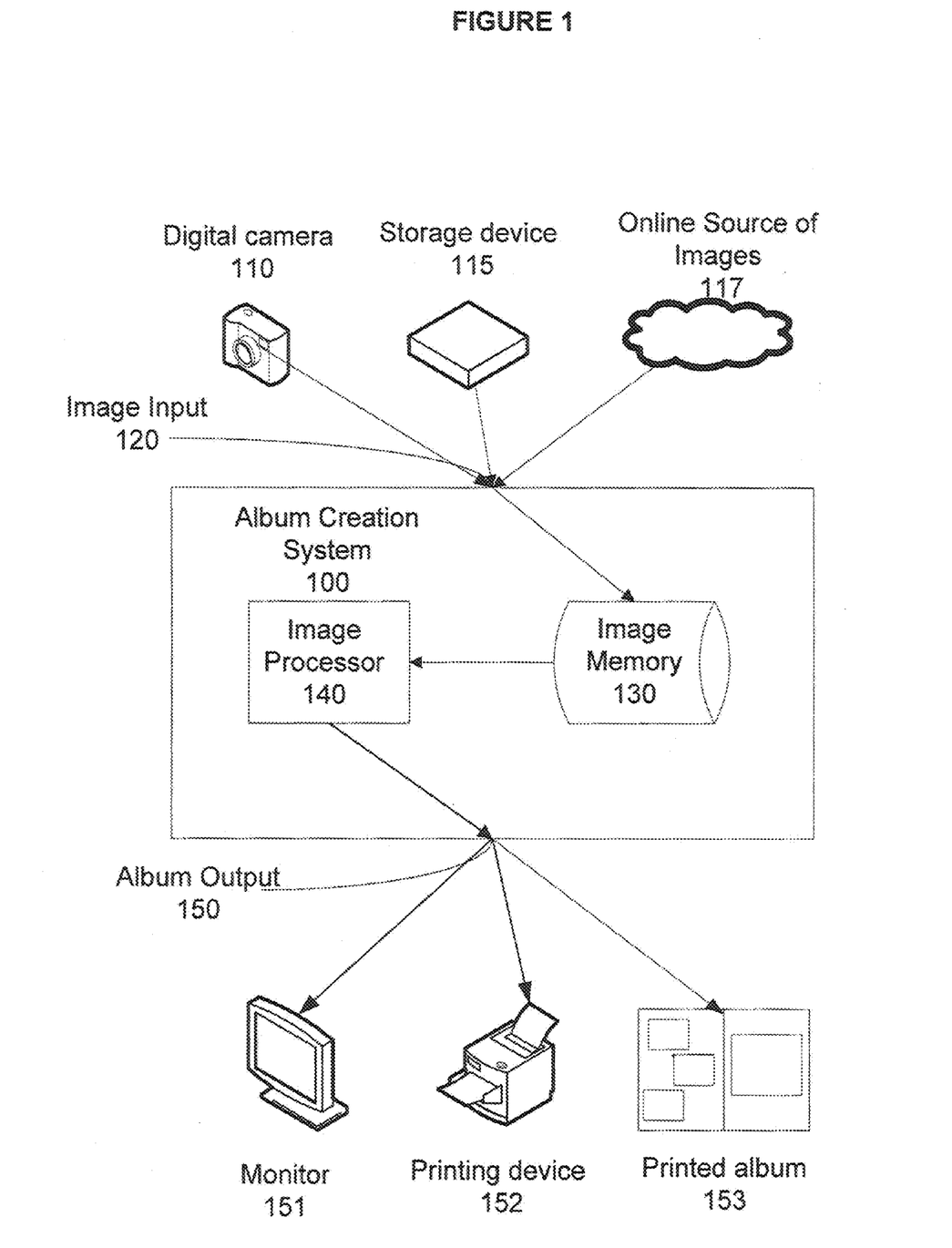
FIG. 1 is a diagram of one embodiment of the invention, a system for creating an album.

FIG. 1 is a diagram of one embodiment of the invention, a system for creating an album. As used in the present specification and in the appended claims, the term "image" suggests an optically formed duplicate or other reproduction of an object formed by a lens or mirror, stored in digital format. Album creation system 100 according to this embodiment includes image input 120, image memory 130, image processor 140, and album output 150.

Image input 120 is configured to accept related images from an image source. As used in this specification and the appended claims, "related images" implies images that share at least one characteristic, or images that pertain to a common theme, subject, or event. Image input 120 connects to one or more image sources. In the embodiment shown in FIG. 1, image input 120 connects to a digital camera 110, a storage device 115 and an online source of images 117. Digital camera 110 can be any type of camera, including a cell phone or other multifunction device that captures images and stores them in digital format. Storage device 115 can be any type of device that electronically stores one or more digital images, including a hard disk drive or memory card. An online source of images 117 can be any internet site that permits downloading of images. In an embodiment, image input 120 is configured to accept related images from a commercial internet site that promotes the organizing and sharing of digital images, such as Snapfish. In an embodiment, image input 120 is configured to accept related images from a social networking internet site. In an embodiment, image input 120 is configured to accept related images from more than one photographer so that album creation is a collaborative effort.

Image input 120 connects to image memory 130, and is further configured to incorporate related images to image memory 130. As used in the present specification and in the appended claims, the term "image memory" implies an electronic storage location for instructions and data. In an embodiment, memory may be in the form of volatile memory, disc drive, or non-volatile memory, including flash memory, on-board or captive digital memory, or removable digital memory such as a Secure Digital (SD) card or a removable/portable disc drive. Image boundary memory 120 may be physical or virtual. In an embodiment, image memory may be in database format, organizing the related images in such a way that a computer program can quickly select desired related images.

Image memory 130 connects to an image processor 140. Image processor 140 is configured to retrieve related images from image memory 130, and to assign a story schema to the related images based upon user input. As used in the present specification and in the appended claims, the term "story schema" implies a set of rules for structure and content that sets the framework for building an album that will tell a story.

The story schema may include one or more sets of taxonomies that are relevant to the theme of the story, page templates with artwork relevant to the theme of the story, layout rules and specifications that dictate how to lay out related images into pages and chapters based on the number of available related images and their corresponding labels from a taxonomy. As used in the present specification and in the appended claims, the term "taxonomy" suggests a set of labels organized into a hierarchical structure that are used to describe related images from a given story schema. In an embodiment, each label in a taxonomy is in one or more parent/child (broader/narrower) relationships to other terms in the taxonomy. For example, the image processor 140 may prompt a user to classify the related images according to preexisting list of story schemas that are most often photographed, and the user may choose the story schema "Kid's Birthday".

Image processor 140 is also configured to use game play with one or more users to assign metadata labels to related images. As used in the present specification and in the appended claims, the term "metadata label" suggests a data label that expresses the context or relativity of a related image In an embodiment, image processor 140 is configured to create thumbnail versions of the related images and to display the thumbnail versions rather than original high resolution related images during game play to allow for faster display of images and a better gaming experience. As used in the present specification and in the appended claims, the term "thumbnail" suggests images that have been downsampled to remove pixels, yet preserve the original aspect ratio as compared to the original high resolution images.

The user may be prompted to participate in a variety of games designed to assign quality, relevance and genre valuations to the related images in order to determine which such related images are included in the album. For example, through game play interaction with a user the image processor 140 might assign metadata labels to an image indicating that the image was a) of good quality, b) of high relevance to a birthday story schema, and c) is a picture of the birthday cake.

In an embodiment, one of the games is structured such that related images rapidly appear from a trunk set in the foreground of the game, and the images become smaller and smaller so as to quickly fade away. The user is invited to click on those related images that he or she deems most cherished, and less valuable related images are allowed to fade out. Based upon the user input (clicking on the related images deemed most valuable by the user), the image processor 140 would attach appropriate metadata labels to the related images that were clicked indicating that the degree of attachment the user had to such related images. In an embodiment, image processor 140 is configured to invite game play by multiple users who have a connection with the related images, in order that that album creation process is a collaborative effort and consider multiple perspectives.

The image processor 140 is further configured to assign album layout rules based upon the story schema and the metadata labels assigned during game play. As used in the present specification and in the appended claims, the term "layout rule" suggests rules the physical properties of that the related images and other elements will possess when they are laid out on a page or pages in narratives. In an embodiment, album layout rules will include rules regarding spatial layout, groupings, order/sequence, visual hierarchy, all of which have been determined based upon the metadata labels that were assigned during gaming. After the creation of album layout rules, the image processor 140 is further configured to create album pages based upon such album layout rules, and to assign related images to the album pages by comparing metadata labels to album layout rules. The image processor 140 will create album pages and populate such album pages with related images according to layout rules that consider the number of related images with attached metadata labels indicating high relevance to the story schema. In an embodiment, the image processor 140 may be configured to stop creating album pages upon the first to occur of 1) reaching n pages, or 2) determining that there are not enough remaining related images with metadata labels indicating sufficient relevance, quality or appropriate genre to create additional album pages.

Image processor 140 connects to album output 150, and is configured to send the finished album to album output 150. Album output 150 is configured to send a finished album that has been generated by image processor 140 to one or more output devices that have a display area. In the embodiment shown, album output 150 is connected to monitor 151, printing device 152 and a printed album 153. Monitor 151 can be of any display type such as a cathode ray tube, flat panel, liquid crystal, or make use of other suitable display technology. Printing device 152 can represent an inkjet, LaserJet, or any other printer technology that enables images to be printed onto a hard copy surface. Further any of the output devices shown in FIG. 1 need not be directly or physically coupled to the album output 150, but may be connected through an intervening computer network, such as a wireless or wireline local area network, a wide area network, or the internet. Printed album 153 is a physical manifestation of the album, created by a printing device 152.

In an embodiment, album creation system 100 may be integral with a computer. As used in this specification and the appended claims, "computer" suggests any device containing a microprocessor or CPU, and shall include, but not be limited to, personal computers, handheld computing devices, workstations, mainframes, and supercomputers. In an embodiment, album creation system 100 may be integral with an image capture system in which case the processed album may be directly downloaded to another device such as a printing device or computer. In an embodiment, album creation system 100 may be integral with an interactive television. In an embodiment, album creation system 100 may be integral with a gaming console. As used in the present specification and in the appended claims, the term "gaming console" suggests an interactive electronic device that produces a video display signal which can be used with a display device to display a video game. In an embodiment, album creation system 100 may be integral with a digital photo frame. As used in this specification and the appended claims, "digital photo frame" implies a picture frame that contains a processor and displays images without the need of a personal computer. In an embodiment, the image processing system 100 may be integral with a printing device so that the processed image may be printed immediately.

Figure 2:
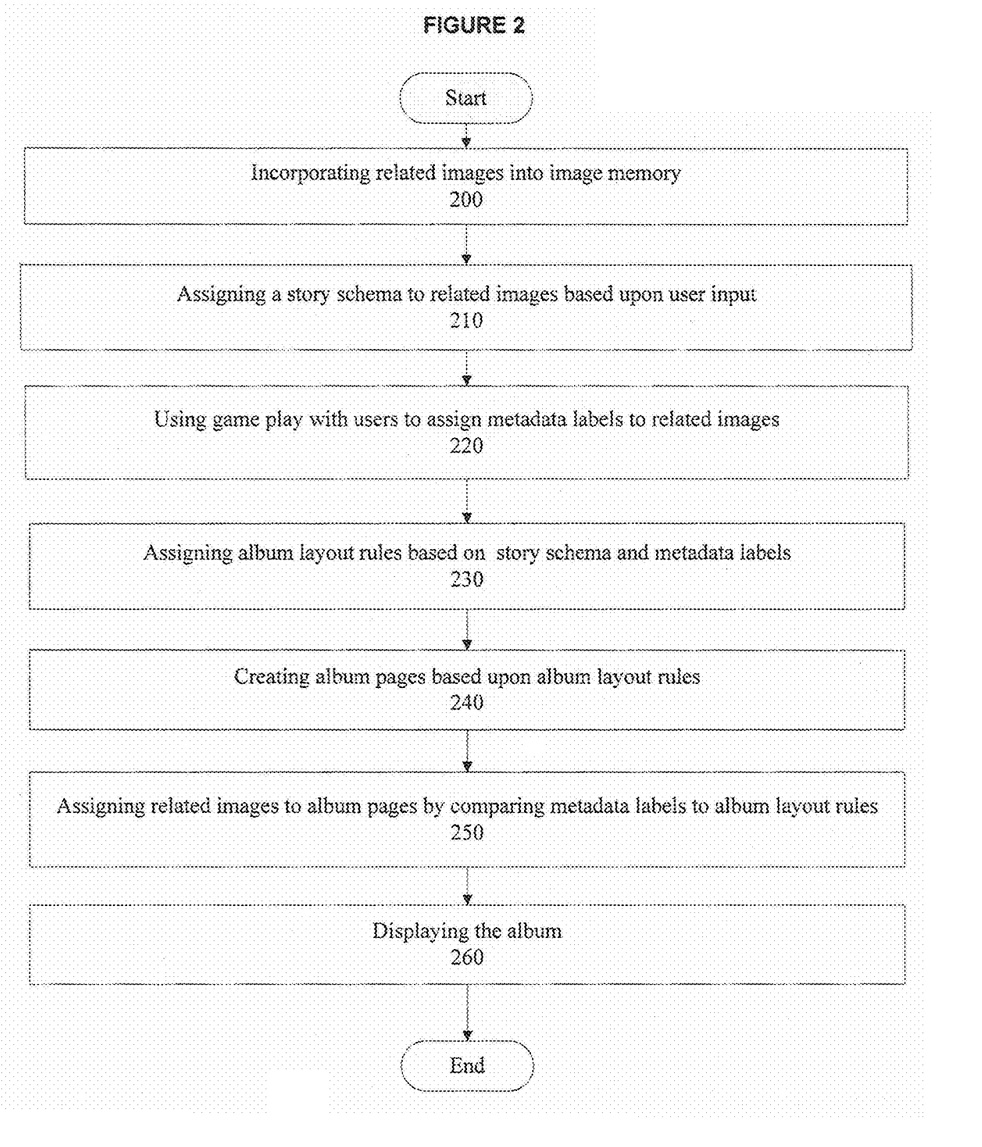
FIG. 2 is a flowchart of one embodiment of the invention, a method of creating an album.

FIG. 2 is a flowchart of one embodiment of the invention, a method of creating an album. The method of FIG. 2 begins at block 200 in which related images are incorporated into image memory. In an embodiment, the related images are retrieved directly from a digital camera. In an embodiment the related images are retrieved from a storage device, having been previously downloaded from a digital camera to the storage device. In an embodiment the related images are retrieved from an internet site that that permits downloading of images. In an embodiment, image memory may be in database format, having been structured by digital photo organization software.

The method continues at block 210 in which a story schema is assigned to the related images based upon user input. In an embodiment, the story schema includes multiple taxonomies that are relevant to the theme of the story, page templates with relevant artwork, layout rules and specifications. In an embodiment the layout rules and specifications are dynamic, and are applied after metadata labels are assigned to related images.

The method continues at block 220 in which game play with one or more users is used to assign metadata labels to related images. In an embodiment, the user may be prompted to participate in a variety of games designed to assign metadata labels to related images according to taxonomies. Such games may be active and test motor skills, such as driving and shooting galleries. Other games may involve racing against a clock or against times logged by other users. Other games would be slower paced traditional games such as card games and puzzles. Other games may be played so as to gather information over a long period of time.

In an embodiment a game is incorporated into a slideshow to incent the user to engage in game play as images that are interesting to the user appear on a computer monitor. As used in this specification and the appended claims, "slideshow" implies a computer program that displays images on a device's monitor, one after the other both a) when initiated by a user, and b) after no user input has been received by the device for a certain length of time. In an embodiment gaming is initiated by user interaction with a slideshow played on a mobile device, and the games are played on the mobile device. In an embodiment gaming is initiated by user interaction with a slideshow played on a digital photo frame, and the games are played on the digital photo frame. In this manner the related images may be sorted, ranked, classified in degree of appropriateness for the story schema while the user is engaged in a fun, non-taxing game activity.

The method continues at block 230 in which album layout rules are assigned based upon story schema and metadata labels. In an embodiment, album layout rules will include rules that consider the optimal number of related images for the selected story schema, and the visual hierarchy of photos in accordance with the prioritization provided by users during gaming.

The method continues at block 240 in which album pages are created based upon album layout rules. In an embodiment, album pages are created according to layout rules that consider the number of available images tagged with metadata labels, and the applicable story schema. For example, an album with a "wedding" story schema may call for more pages and related images than one with the story schema "first haircut".

The method continues at block 250 in which images are assigned to album pages by comparing metadata labels to album layout rules. In an embodiment the related images are assigned to specific locales in the album based upon attached metadata labels indicating that an image is the "hero", "favorite", "birthday girl", and "good quality".

The method continues at block 260 in which the album is displayed. In an embodiment the album is displayed by generating a hard-copy version of the album using a printing device, such as an inkjet, LaserJet, or any other printer technology that enables images to be printed onto a hard copy surface. In an embodiment, the album may be displayed on an electronic display device such as a computer monitor.

Figure 3:
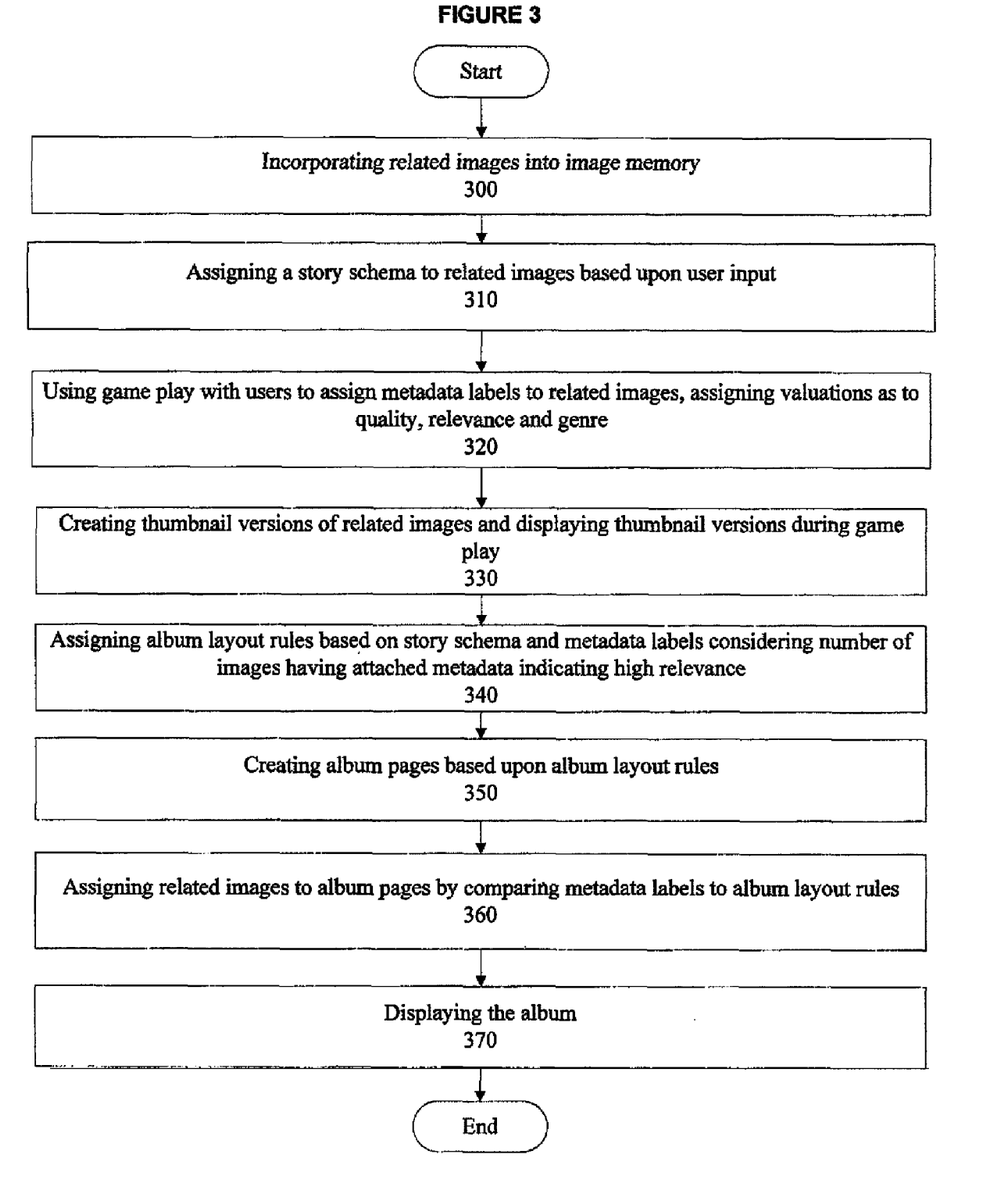
FIG. 3 is a flowchart of one embodiment of the invention, a method of creating an album.

FIG. 3 is a flowchart of one embodiment of the invention, a method of creating an album. The method of FIG. 3 begins at block 300 in which related images are incorporated into image memory.

The method continues at block 300 in which a story schema is assigned to the related images based upon user input.

The method continues at block 310 in which a story schema is assigned to related images based upon user input.

The method continues at block 320 in which game play with one or more users is used to assign metadata labels to related images, assigning valuations as to quality, relevance and genre. For example, through game play interaction with a user metadata labels may be assigned to an image indicating that the image was a) of high relevance to a birthday story schema, b) a picture of the birthday girl and her family, c) of poor quality, and d) not repairable. In this example the related image would not be used in the album. In this manner the related images may be sorted, ranked, classified in degree of appropriateness for the story schema and album to be created during activity that the users will enjoy. In an embodiment, the game play is initiated when a user interacts via the monitor or another interface with a digital photo frame slideshow.

The method continues at block 330 in which thumbnail versions of related images and created, and the thumbnail versions are displayed during game play. In an embodiment, use of these thumbnail versions rather than high resolution images greatly speeds up the start of game play.

The method continues at block 340 in which album layout rules are assigned based upon story schema and metadata labels. In an embodiment, album layout rules will include rules regarding the optimal number of related images and the visual hierarchy of photos in accordance with the prioritization provided by the users during gaming.

The method continues at block 350 in which album pages are created based upon album layout rules. In an embodiment, album pages are created according to layout rules that consider the number of available images tagged with metadata labels, and the applicable story schema.

The method continues at block 360 in which images are assigned to album pages by comparing metadata labels to album layout rules.

The method continues at block 370 in which the album is displayed. In an embodiment the album is displayed by generating a hard-copy version of the album using a printing device, such as an inkjet, LaserJet, or any other printer technology that enables images to be printed onto a hard copy surface. In an embodiment, the album may be displayed on an electronic display device such as a computer monitor.

Figure 4:
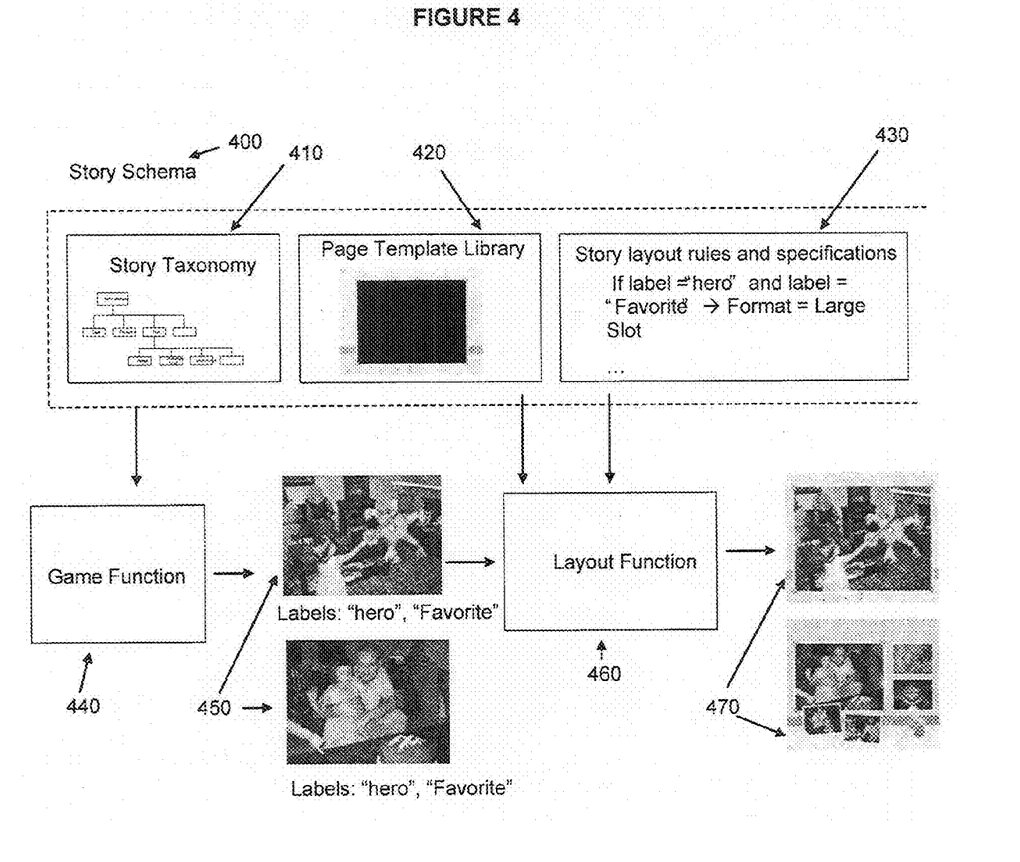
FIG. 4 is an example of a story schema as applied to gaming function and layout function, according to an embodiment of the invention.

FIG. 4 is an example of a story schema as applied to gaming function and layout function, according to an embodiment of the invention. In this example the story schema 400 is "Kid's Birthday". The story schema includes a theme-specific taxonomy 410, a page template library 420 tailored to the story schema 400 and layout rules 430 tailored to the story schema 400. In this example a gaming function 440 attached metadata labels to related images 450. The layout module 460 then assigns the related images 450 to the album 470 based upon the layout rules 430. In this example the related images 450 labeled "hero" and "favorite" are given priority sizing and location in the finished album 470.

Figure 5:
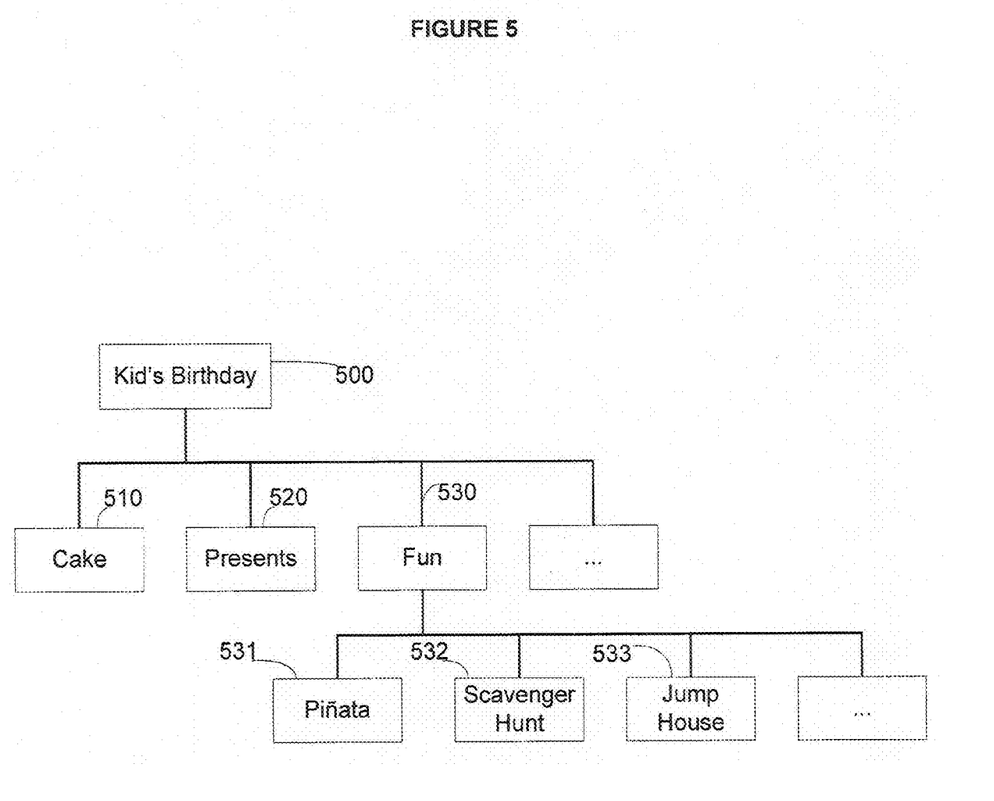
FIG. 5 is an example of a theme-specific taxonomy, according to an embodiment of the invention.

FIG. 5 is an example of a theme-specific taxonomy, according to an embodiment of the invention. In this embodiment, the theme-specific taxonomy "Kid's Birthday" 500 includes the labels "cake" 510, "presents" 520, and "fun" 530. The label "fun" 530 contains subclass labels "pinata" 531, "scavenger hunt" 532 and "jump house" 533.

Figure 6:
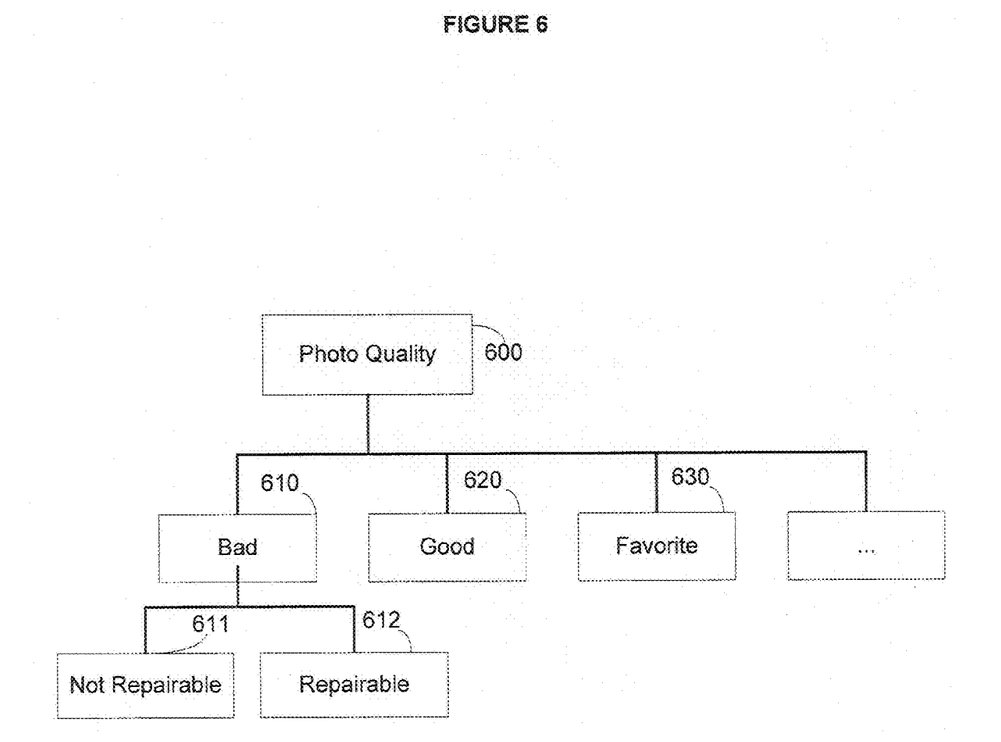
FIG. 6 is an example of a general taxonomy, according to an embodiment of the invention.

FIG. 6 is an example of a general taxonomy, according to an embodiment of the invention. In this example, the general taxonomy "Quality" 600 includes the labels "bad" 610, "good" 620, and "favorite" 630. The label "bad" 610 contains subclass labels "repairable" 611 and "not repairable" 612.

Figure 7:
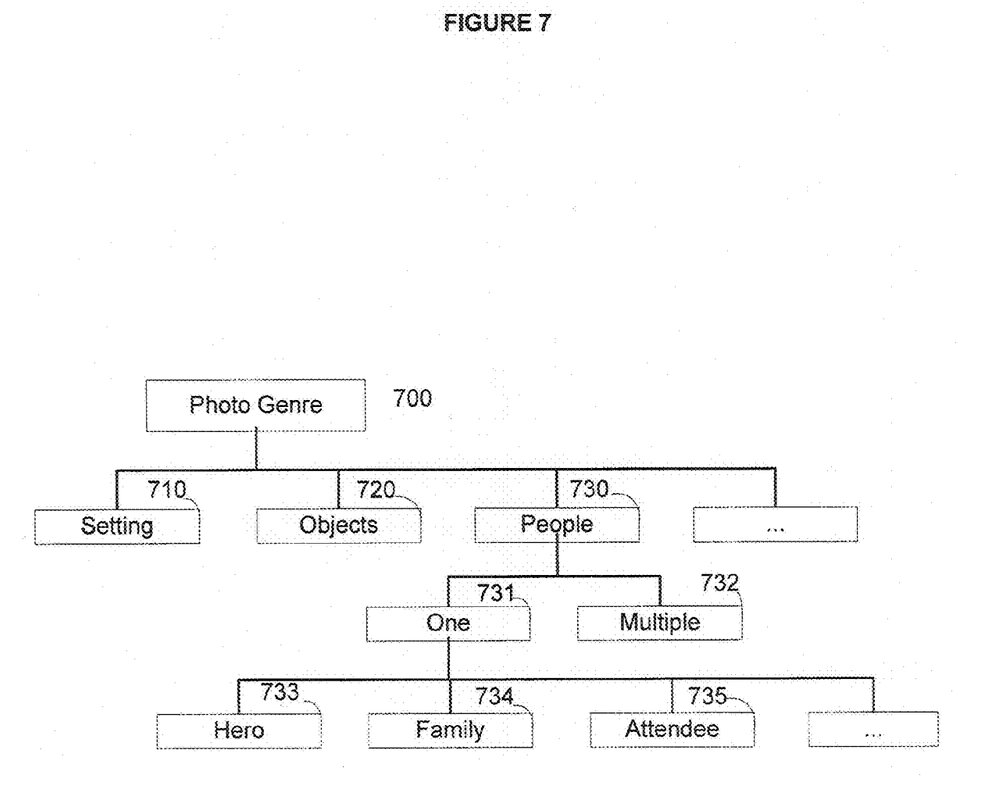
FIG. 7 is an example of a general taxonomy, according to an embodiment of the invention.

FIG. 7 is an example of a general taxonomy, according to an embodiment of the invention. In this embodiment, the general taxonomy "Photo Genre" 700 includes the labels "setting" 710, "objects" 720, and "people" 730. The label "people" 730 contains subclass labels "one" 731 and "multiple" 732. The subclass label "one" 731 contains subclass labels "hero" 733, "family" 734, and "attendee" 735.

Figure 8:
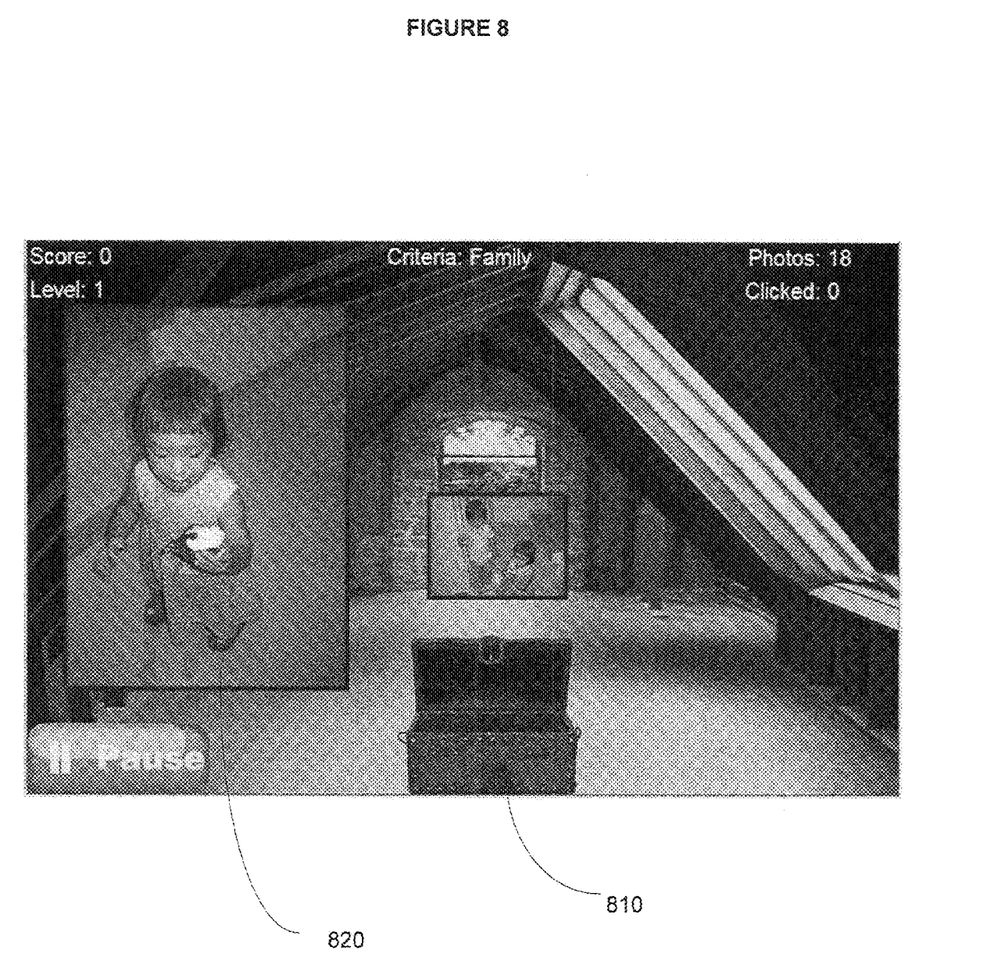
FIG. 8 is a screenshot example of using game play to assign metadata labels to related images, according to an embodiment of the invention.

FIG. 8 is a screenshot example of using game play to assign metadata labels to related images, according to an embodiment of the invention. In this example, the game is structured such that related images rapidly appear from a trunk 810 set in the foreground of the game, and the related images become smaller and smaller so as to quickly fade away. The user is invited to click on those related images that he or she deems a most cherished image 820, and less valuable related images are allowed to fade away. Based upon the user input (clicking on the related images deemed most valuable by the user), metadata labels are attached to the related images that were clicked indicating the degree of attachment the user had to such related images.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for creating an album comprising:
   incorporating a plurality of related images into an image memory;
   assigning a story schema to the plurality of related images based upon input from at least one user;
   using game play with at least one user to assign metadata labels to at least one of the plurality of related images, the game play including
      images appearing and fading away and inviting a user to click on those images most relevant, and
      assigning a relevance valuation to at least one of the plurality of related images to determine which of the plurality of related images are to be included in the album;
   assigning album layout rules based upon the story schema and the metadata labels, including considering the number of the plurality of related images that have attached metadata labels indicating high relevance to the story schema;
   creating album pages based upon the album layout rules;
   assigning at least one of the plurality of related images to the album pages by comparing the metadata labels to the album layout rules; and
   displaying the album.

2. The method of claim 1, further comprising creating thumbnail versions of at least one of the plurality of related images and displaying the thumbnail versions during the game play with at least one user.

3. The method of claim 1, wherein using game play with at least one user to assign metadata labels to at least one of the plurality of related images comprises assigning a quality valuation to at least one of the plurality of related images to determine which of the plurality of related images are to be included in the album.

4. The method of claim 1, wherein using game play with at least one user to assign metadata labels to at least one of the plurality of related images comprises assigning a genre valuation to at least one of the plurality of related images to determine which of the plurality of related images are to be included in the album.

5. The method of claim 1, wherein the using game play with at least one user to assign metadata labels to at least one of the plurality of related image is launched by the at least one user's interaction with a slideshow.

6. The method of claim 1, wherein the using game play with at least one user to assign metadata labels to at least one of the plurality of related image is launched by the at least one user's interaction with a slideshow on a digital photo frame.

7. The method of claim 1, wherein the incorporating a plurality of related images into an image memory comprises receiving the plurality of related images from multiple users.

8. A system for creating an album, comprising:
   an image input configured to receive a plurality of related images;
   an image memory coupled to the image input;
   an image processor coupled to the image memory; and
   an album output coupled to the image processor;
   wherein the image processor is configured to:
      retrieve the plurality of related images from the image memory;
      assign a story schema to the plurality of related images based upon input from at least one user;
      use game play with at least one user to assign metadata labels to at least one of the plurality of related images, the game play including
         images appearing and fading away and inviting a user to click on those images most relevant, and
         assigning a relevance valuation to at least one of the plurality of related images to determine which of the plurality of related images are to be included in the album;
      assign album layout rules based upon the story schema and the metadata labels, including considering the number of the plurality of related images that have attached metadata labels indicating high relevance to the story schema;
      create album pages based upon the album layout rules; and
      assign at least one of the plurality of related images to the album pages by comparing the metadata labels to the album layout rules; and
      send the album to the album output.

9. The system of claim 8, wherein the image processor is configured to create thumbnail versions of at least one of the plurality of related images and display the thumbnail versions during the game play with at least one user.

10. The system of claim 8, wherein the image processor is configured to use game play with at least one user to assign metadata labels to at least one of the plurality of related images and is further configured to assign a quality valuation to the plurality of related images to determine which of the plurality of related images are to be included in an album.

11. The system of claim 8, wherein the image processor is configured to use game play with at least one user to assign metadata labels to at least one of the plurality of related images and is further configured to assign a genre valuation to the plurality of related images to determine which of the plurality of related images are to be included in an album.

12. The system of claim 8, wherein the image processor is configured to use game play with at least one user to assign metadata labels to at least one of the plurality of related images and is further configured to launch the game play by the at least one user's interaction with a slideshow.

13. The system of claim 8, wherein the system is integral with a digital photo frame.

14. The system of claim 8, wherein the game includes one of a target-shooting game, a race against a clock game, a card game, and a puzzle game.

15. The system of claim 8, wherein the image processor is included within an image capture system.

16. The system of claim 8, wherein the image processor is included within a printing device.

17. The system of claim 8, wherein the image processor is included within an interactive television.

18. The system of claim 8, wherein the image processor is included within a gaming console.

19. A non-transitory computer-readable medium having computer executable instructions thereon which, when executed, cause a processor to perform a method, the method comprising:
- incorporating a plurality of related images into an image memory;
- assigning a story schema to the plurality of related images based upon input from at least one user;
- using game play with at least one user to assign metadata labels to at least one of the plurality of related images, the game play including
  - images appearing and fading away and inviting a user to click on those images most relevant, and assigning a relevance valuation to at least one of the plurality of related images to determine which of the plurality of related images are to be included in the album, wherein the metadata labels indicate a relevance valuation or a quality valuation;
- assigning album layout rules based upon the story schema and the metadata labels including considering the number of the plurality of related images that have attached metadata labels indicating high relevance to the story schema;
- creating album pages based upon the album layout rules;
- assigning at least one of the plurality of related images to the album pages by comparing the metadata labels to the album layout rules; and
- displaying the album.

\* \* \* \* \*